Feb. 1, 1955   H. F. SMITH   2,700,774
COMBINED METAL RING AND RUBBER GASKET
Filed Jan. 10, 1952

INVENTOR.
HARRY F. SMITH
BY
RICHEY, WATTS, EDGERTON & McNENNY
ATTORNEYS

United States Patent Office 2,700,774
Patented Feb. 1, 1955

2,700,774

COMBINED METAL RING AND RUBBER GASKET

Harry F. Smith, Lexington, Ohio, assignor to Mansfield Sanitary Pottery, Inc., Perrysville, Ohio, a corporation of Ohio Application January 10, 1952, Serial No. 265,900

6 Claims. (Cl. 4—68)

This invention relates generally to the gasket art and is particularly concerned with a new composite gasket especially suited for use with close coupled water closet combinations.

Close coupled water closet combinations, as constructed heretofore, have included a rubber ring surrounding the spud and interposed between the tank and bowl to prevent leakage of water out through the space between these two parts. A flat nut has been screwed onto the spud outside of the tank to pull the spud down against a gasket within the tank to prevent leakage out of the tank around the spud. This arrangement of parts has not been entirely satisfactory both because of the difficulty of assembling and properly placing the tank, bowl and loose rubber ring and because the rubber of the ring could deform in several directions and, hence, make an imperfect or unreliable seal.

The present invention aims to overcome these former disadvantages and attains this object by providing a composite gasket comprising a nut having a tubular extension and a resilient ring operatively associated therewith, the nut and its extension serving to restrict the directions in which the ring may be deformed and the ring serving to make liquid sealing contact with the nut and extension and also a bowl and tank. While the present invention is quite important in connection with close coupled water closet combinations, composite gaskets embodying the invention may be widely used in other devices.

The present invention will be better understood by those skilled in the art from the drawings which accompany and form a part of this specification and in which.

Figure 1:
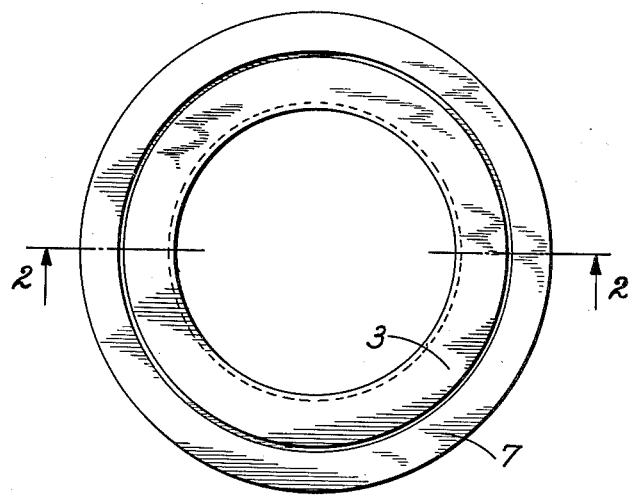
Fig. 1 is a top, plan view of one form of the present invention.
Figure 2:
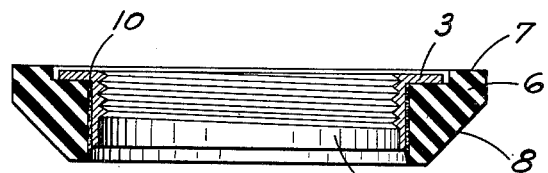
Fig. 2 is a cross-sectional view taken on line 2—2 of Fig. 3.
Figure 3:
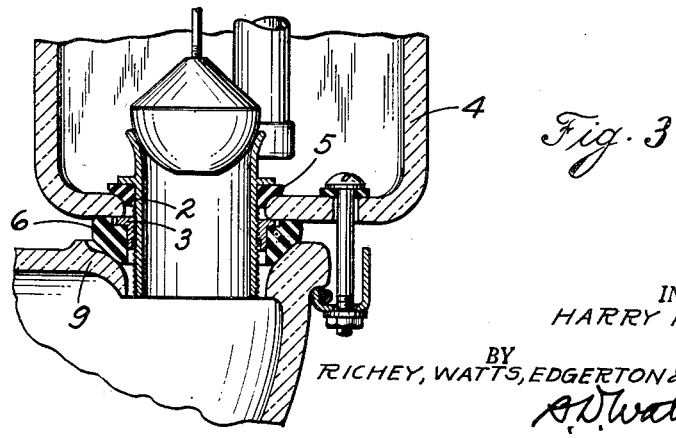
Fig. 3 is a fragmentary, cross-sectional view showing the device of Figs. 1 and 2 in assembled position with a close coupled water closet combination.

The composite gasket illustrated herein comprises a metal ring having an interiorly threaded tubular portion 1 for screw-threaded engagement on a member such as the spud 2 of Fig. 3 and a flange 3 projecting outwardly from the tubular portion. The flange 3 resembles the flat nut used heretofore to bear against the bottom of a flush tank and draw the spud against packing therearound on the inside of the tank. As shown in Fig. 3, the flange 3 bears against the bottom of tank 4 and the tubular part 1 of the ring serves to draw the spud 2 against packing 5 around the spud in the tank to seal the space between the spud and tank against leakage of water therethrough.

An annulus 6 of resilient material, for example, rubber, embraces the tubular portion 1 of the ring, bears against the adjacent surface of flange 3 and has an annular rib 7 spaced outwardly from the outer periphery of flange 3 and at least equal in axial length to the axial thickness of the flange. Preferably rib 7 should be slightly longer than the thickness of flange 3 so that when the gasket is assembled with a flush tank the rib 7 will contact with, and be deformed into fluid sealing engagement with, the irregular lower surface of the tank before flange 3 contacts the tank. As illustrated, the resilient annulus 6 has its other end cut away to form an inclined surface 8 which, as shown, is substantially conical. This surface is so shaped to seat on the curved surface of the bowl 9 around the opening through which the spud 2 projects. The resilient annulus 6 is preferably long enough axially to keep the tank 4 and bowl 9 out of contact with each other when finally assembled.

The annulus 6 may be operatively associated with the metal ring by having a normal internal diameter slightly less than the outside diameter of the tubular portion 1 of the ring or by being attached to the outer surface of the tubular portion as by cement 10 or other suitable adhesive or by bonding. Any other expedient may be resorted to which, like those just mentioned, will keep the ring and annulus in assembled position during handling and use.

It will be noted that the metal ring restrains annulus 6 as regards the direction in which it may be deformed. That is, with the ring and annulus assembled as shown and described, the tubular portion 1 prevents inward deformation of the ring and the flange 3 prevents endwise deformation in one direction for its full area. When in use, such as is shown in Fig. 3, the forces which urge tank 4 toward bowl 9 will press the ends of the annulus into closer sealing contact with the surfaces of the tank and bowl and will deform the annulus. Some of this deformation will be endwise past the outer edge of flange 3 and will force the rib 7 into closer engagement with the irregular outer surface of the bottom wall of the tank. Such engagement will seal against water leaking past the gaskets and onto the bottom wall of the tank whence it may drip onto the floor. Other deformation will take place upwardly and outwardly due to the converging walls of the tank and bowl, and such deformation will increase the sealing contact of the ring with both bowl and tank.

This application is a continuation-in-part of my copending application Serial No. 172,509 filed July 7, 1950, since matured as Patent No. 2,590,471, dated March 25, 1952. Subject matter shown but not claimed herein is being claimed in said parent application.

Having thus described the present invention so that others skilled in the art will be able to understand and practice the same, I state that what I desire to secure by Letters Patent is defined in what is claimed.

What is claimed is:

1. A composite gasket comprising a continuous metal ring having an interiorly threaded tubular portion and a continuous flange projecting outwardly at one end of said tubular portion and an annulus of resilient material embracing the tubular portion of the ring and engaging the adjacent side of said flange, said annulus projecting beyond the flangeless end of the ring and having an annular rib surrounding and projecting beyond the flange at the other end of the ring, said rib being deformable axially under forces applied thereto axially of said ring.

2. A composite gasket for a water closet comprising a continuous metal ring having an interiorly threaded tubular portion to be screwed onto a spud and having a continuous flange projecting outwardly at one end of said tubular portion and engageable with the outer surface of a water closet tank and an annulus of resilient material embracing the tubular portion of the ring and engaging the adjacent side of said flange, said annulus projecting beyond the flangeless end of the ring and having an inclined outer surface to seat on the inlet opening wall of a water closet bowl and having an annular rib surrounding and projecting beyond the flange at the other end of the ring, said rib being deformable into sealing engagement with the bottom surface of the tank under forces applied to the annulus by the assembled tank and bowl.

3. A composite gasket for a water closet comprising a continuous metal ring having an interiorly threaded tubular portion to be screwed onto a spud and having a continuous transverse flange projecting outwardly at one end of said tubular portion and engageable with the outer surface of a water closet tank and an annulus of resilient material embracing the tubular portion of the ring and engaging the adjacent side of said flange, said annulus projecting beyond and having a conical outer surface near the flangeless end of the ring and having an annular rib surrounding and projecting axially beyond the flange at the other end of the ring, said rib being deformable axially under forces applied axially of said ring.

4. A composite gasket for a water closet comprising a continuous metal ring having an interiorly threaded tubular portion to be screwed onto a spud and having a continuous transverse flange projecting outwardly at one end of said tubular portion and an annulus of resilient material embracing the tubular portion of the ring and engaging the adjacent side of said flange, said annulus projecting beyond and having a conical surface near the flangeless end of the ring and having an annular rib surrounding, spaced radially outwardly from, and projecting axially beyond said flange, said rib being deformable radially and axially under forces applied axially to the ring.

5. A composite gasket for a water closet comprising a continuous metal ring having an interiorly threaded tubular portion to be screwed onto a spud and having a continuous transverse flange projecting outwardly at one end of said tubular portion and an annulus of resilient material secured to the tubular portion of the ring and engaging the adjacent side of said flange, said annulus being secured between its ends to said ring, projecting beyond the flangeless end of the ring and having an annular rib surrounding, spaced radially outwardly from, and projecting axially beyond the said flange, said rib being deformable radially inwardly and outwardly and also axially under compressive forces applied axially to said annulus.

6. A close coupled water closet comprising a bowl having a water inlet and an annular seating surface around the inlet, a tank having a water outlet in its bottom wall, a spud extending through said outlet and into said inlet, a gasket between the spud and inner surface of the tank to seal against escape of water about the spud, and a composite gasket comprising a continuous metal tube threaded onto said spud and having an outstanding continuous flange at its upper end to engage the outer surface of the bottom wall of the tank and a resilient annulus bearing against the outer side of said tube and the lower side of said flange, said annulus projecting beyond the flangeless end of said ring and having an adjacent outer inclined surface for sealing engagement with the walls of the water inlet opening of the bowl, and having an annular rib surrounding, spaced radially outward from and projecting axially beyond said flange to engage the outer surface of the bottom wall of the tank, said rib being deformable axially to make good sealing contact with said outer surface under forces applied axially to said annulus by said tank and bowl.

References Cited in the file of this patent

UNITED STATES PATENTS

| | | |
|---|---|---|
| 712,775 | Dixon | Nov. 4, 1902 |
| 2,167,354 | Gavin | July 25, 1939 |
| 896,204 | Glauber | Aug. 18, 1908 |
| 2,132,636 | Maahs | Oct. 11, 1938 |
| 2,344,698 | Howe | Mar. 21, 1944 |